UNITED STATES PATENT OFFICE 2,644,813

CUPRIFEROUS POLYAZO DYESTUFFS

Hans Ruckstuhl and Walter Wehrli, Basel, Switzerland, assignors to Sandoz A. G., Basel, Switzerland, a Swiss firm No Drawing. Application January 16, 1952, Serial No. 266,778. In Switzerland January 19, 1951

8 Claims. (Cl. 260—145)

The present invention relates to polyazo dyestuffs.

A primary object of the invention is the embodiment of a group of polyazo dyestuffs characterized inter alia by superior affinity for textile fibers, especially cotton and regenerated cellulose, and by their ability to yield dyeings in light-fast and wash-fast blue-gray to green-gray shades.

This object is realized, according to the present invention, by the cupriferous polyazo dyestuffs which are obtained when 1 mol of tetrazotized 3,3'-dimethoxy-4,4'-diamino-1,1'-diphenyl is coupled first with 1 mol of the monoazo dyestuff (or of the copper complex thereof) of the formula (I)

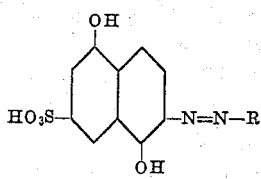

wherein R stands for the radical, which is coupled in ortho-position to the hydroxy group thereof, of a hydroxynaphthalene or of a hydroxynaphthalene monosulfonic acid or of a hydroxynaphthalene disulfonic acid or of a hydroxynaphthalene trisulfonic acid or of a sulfonated pyrazolone or of an unsulfonated pyrazolone, and is then coupled with 1 mol of the same or any other coupling component, and the resultant polyazo dyestuff treated in substance or on the fiber with copper-yielding agents.

Illustrative R radicals in Formula I, supra, are for example the radicals of:

2-hydroxynaphthalene,
1-hydroxynaphthalene-3-sulfonic acid,
1-hydroxynaphthalene-4-sulfonic acid,
2-hydroxynaphthalene-4-sulfonic acid,
2-hydroxynaphthalene-6-sulfonic acid,
2-hydroxynaphthalene-7-sulfonic acid,
1-hydroxynaphthalene-3,6-disulfonic acid,
1-hydroxynaphthalene-4,8-disulphonic acid,
1-hydroxynaphthalene-3,8-disulfonic acid,
2-hydroxynaphthalene-3,6-disulfonic acid,
1-hydroxynaphthalene-3,6,8-trisulfonic acid,
1-phenyl-3-methyl-5-pyrazolone,
1-(2'-sulfophenyl)-3-methyl-5-pyrazolone,
1-(3'-sulfophenyl)-3-methyl-5-pyrazolone,
1-(4'-sulfophenyl)-3-methyl-5-pyrazolone,
1-(2',5'-disulfophenyl)-3-methyl-5-pyrazolone,
1-phenyl-5-pyrazolone-3-carboxylic acid,
1-(3'-carboxyphenyl)-3-methyl-5-pyrazolone,
etc.

As the second coupling component, there may be used any of the precedingly-enumerated compounds, as well as any other compound which couples in ortho-position to a phenolic hydroxy group or in ortho-position to a hydroxy group formed by enolization. Among others, the following compounds may be used in this regard:

2-amino-5-hydroxynaphthalene-7-sulfonic acid,
1-chloro-2-amino-5-hydroxynaphthalene-7-sulfonic acid,
2-acetylamino-5-hydroxynaphthalene-7-sulfonic acid,
2-benzoylamino-5-hydroxynaphthalene-7-sulfonic acid,
2-methylamino-5-hydroxynaphthalene-7-sulfonic acid,
2-phenylamino-5-hydroxynaphthalene-7-sulfonic acid,
1-amino-8-hydroxynaphthalene-4-sulfonic acid,
1-phenylamino-8-hydroxynaphthalene-4-sulfonic acid,
2-amino-8-hydroxynaphthalene-6-sulfonic acid,
2-(4'-carboxyphenylamino)-8-hydroxynaphthalene-6-sulfonic acid,
1-amino-8-hydroxynaphthalene-3,6-disulfonic acid,
1-acetylamino-8-hydroxynaphthalene-3,6-disulfonic acid,
1-benzoylamino-8-hydroxynaphthalene-3,6-disulfonic acid,
1-amino-8-hydroxynaphthalene-2,4-disulfonic acid,
1-amino-8-hydroxynaphthalene-3,5-disulfonic acid,
2-amino-5-hydroxynaphthalene-1,7-disulfonic acid,
2-amino-8-hydroxynaphthalene-3,6-disulfonic acid,
2-acetylamino-8-hydroxynaphthalene-3,6-disulfonic acid,
1,8-dihydroxynaphthalene-3,6-disulfonic acid,
etc.

It is to be understood that the preceding list is purely illustrative and is not at all intended to be limitative.

The monoazo dyestuffs used for coupling are preferably employed in the form of the copper complex, and they may be used for the first or for the second coupling with the tetrazotized 3,3'-dimethoxy-4,4'-diamino-1,1'-diphenyl. The couplings are carried out in alkaline medium, preferably in medium made alkaline with sodium carbonate, although in some cases the second coupling may be carried out with the addition of pyridine.

To prepare the copper complex in substance, the obtained corresponding polyazo dyestuff is treated with copper-yielding agents until the methoxy groups are split and the dyestuff has been converted into the copper complex. The coppering may be carried out in a diversity of ways which per se are known from the literature: for example, by heating the dyestuff in weekly alkaline aqueous medium with copper tetramine hydroxide complex in the presence or absence of an organic base or with the aid of fused alkali metal salts of aliphatic monocarboxylic acids with copper salts.

250 parts of pyridine and 50 parts of aqueous ammonia (25%) in 500 parts of water. Upon completion of the coupling, the formed trisazo dyestuff is isolated and subjected to demethylating coppering.

The thus-prepared copper complex of the trisazo dyestuff is, in the dry state, a dark powder which dissolves in water with blue coloration and in concentrated sulfuric acid with blue-green coloration, and dyes cotton in fast blue-gray shades.

It corresponds to the formula

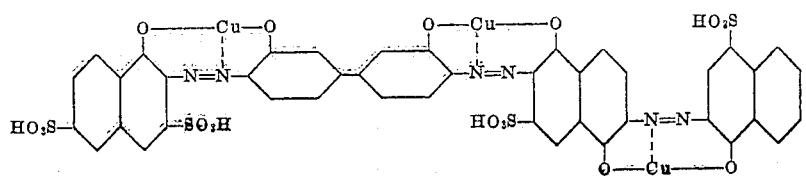

The products obtained according to the present invention dye cotton and regenerated cellulose in blue-gray to green-gray shades. The dyeings are characterized by an outstanding affinity for the fiber, and the dyeings by very good fastness to light and to washing.

It is also possible to dye the fabric with the uncoppered or partly coppered polyazo dyestuffs and then to treat the latter on the fiber with copper-yielding agents.

The following examples illustrate the invention by means of representative exemplary embodiments thereof; these examples are not at all to be considered as limitative of the scope of the invention. The demethylating coppering is in each case per se conventional and may be carried out for example in the manner precedingly described. The isolation of the intermediate and of the final products is carried out in each case in per se conventional manner, for example by salting out and filtering. The parts and percentages are by weight. The term "soda" refers to sodium carbonate.

A dyestuff with similar properties is obtained in entirely analogous manner by replacing the 55.2 parts of the copper complex of the monoazo dyestuff of the Formula II, supra, by the corresponding amount of the copper complex of the monoazo dyestuff of the formula

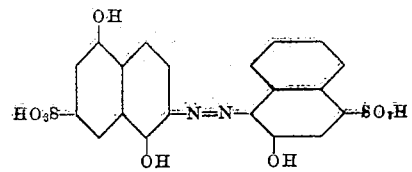

The thus-prepared product corresponds to the formula

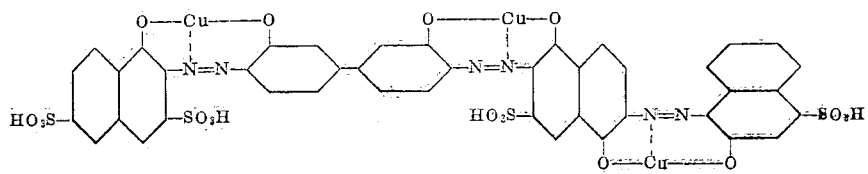

*Example 1*

The tetrazo compound from 24.4 parts of 3,3'-dimethoxy-4,4'-diamino-1,1'-diphenyl is coupled in soda-alkaline medium with 30.4 parts of 1-hydroxynaphthalene-3,6-disulfonic acid. The resultant intermediate is isolated and introduced into a solution of 55.2 parts of the copper complex of the monoazo dyestuff of the formula (II) 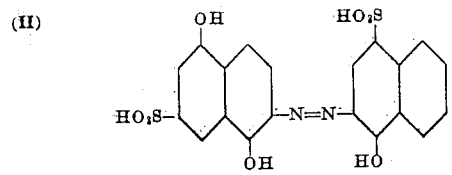

*Example 2*

The tetrazo compound from 24.4 parts of 3,3'-dimethoxy-4,4'-diamino-1,1'-diphenyl is coupled in soda-alkaline medium with 22.4 parts of 1-hydroxynaphthalene-4-sulfonic acid. The resultant intermediate is isolated and introduced into a solution of 63.2 parts of the copper complex of the monoazo dyestuff of the formula

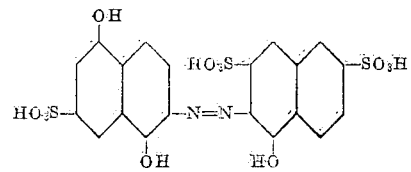

250 parts of pyridine and 50 parts of aqueous ammonia (25%) in 500 parts of water. Upon completion of the coupling, the formed trisazo dyestuff is isolated and subjected to demethylating coppering.

The thus-prepared copper complex of the trisazo dyestuff is, in the dry state a dark powder which dissolves in water as well as in concentrated sulfuric acid with blue coloration, and dyes cotton in fast blue-gray shades.

It corresponds to the formula

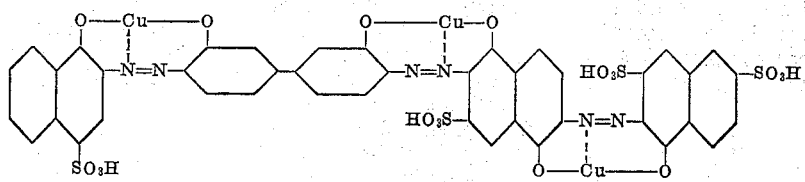

A dyestuff with similar properties is obtained in entirely analogous manner by replacing the 1-hydroxynaphthalene-4-sulfonic acid by the corresponding amount of 2-hydroxynaphthalene-4-sulfonic acid. The copper complex thus obtained corresponds to the formula

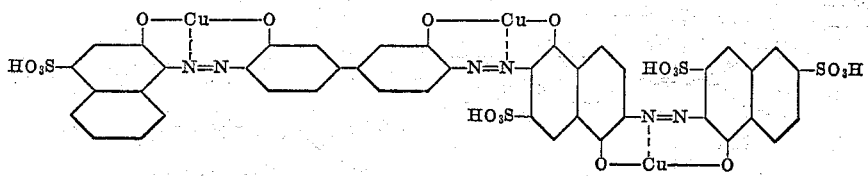

Example 3

The tetrazo compound from 24.4 parts of 3,3'-dimethoxy-4,4'-diamino-1,1'-diphenyl is coupled in soda-alkaline medium with 32.0 parts of 1,8-dihydroxynaphthalene-3,6-disulfonic acid. The resultant intermediate is isolated and introduced into a solution of 58.2 parts of the copper complex of the monoazo dyestuff of the formula

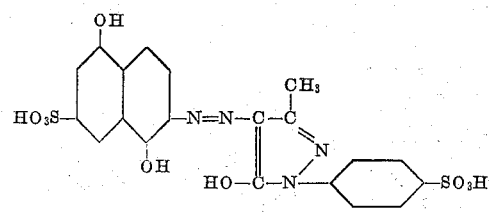

250 parts of pyridine and 56 parts of aqueous ammonia (25%) in 500 parts of water. Upon completion of the coupling, the formed trisazo dyestuff is isolated and subjected to demethylating coppering.

The thus-prepared copper complex of the trisazo dyestuff is, in the dry state, a dark powder which dissolves in water with blue coloration and in concentrated sulfuric acid with bluish green coloration, and dyes cotton in greenish gray shades.

It corresponds to the formula

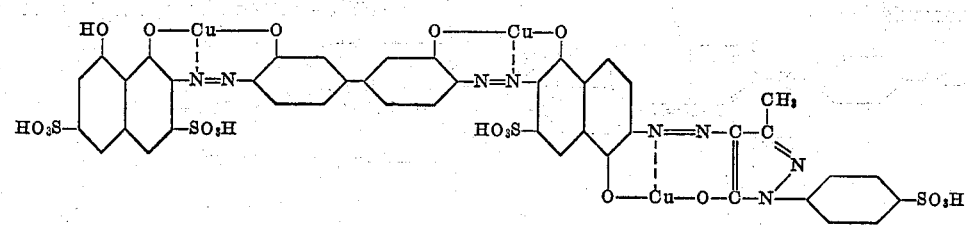

Example 4

The tetrazo compound from 24.4 parts of 3,3'-dimethoxy-4,4'-diamino-1,1'-diphenyl is subjected to soda-alkaline coupling with 63.2 parts of the copper complex of the monoazo dyestuff of the formula (III)

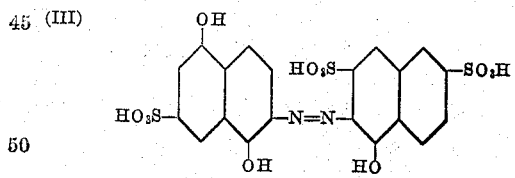

in solution in 400 parts of water. The resultant fully-precipitated intermediate is filtered off and is introduced into a solution of 25.4 parts of 1-(4'-sulfophenyl)-3-methyl-5-pyrazolone and 40 parts of sodium carbonate in 500 parts of water. Upon completion of the coupling, the formed trisazo dyestuff is isolated and subjected to demethylating coppering.

The thus-prepared copper complex of the trisazo dyestuff is, in the dry state, a dark powder which dissolves in water as well as in concentrated sulfuric acid with blue coloration, and dyes cotton in gray shades.

It corresponds to the formula

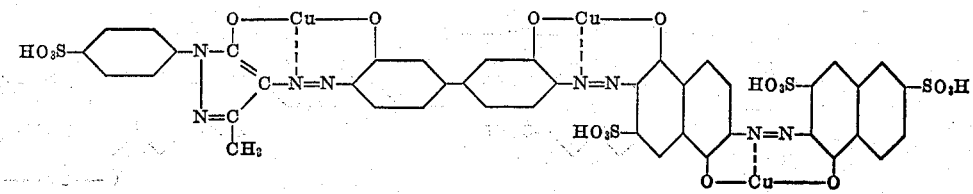

A dyestuff with similar properties is obtained in entirely analogous manner by replacing the 63.2 parts of the copper complex of the monoazo dyestuff of Formula III, supra, by the corresponding quantity of the copper complex of the monoazo dyestuff of the formula

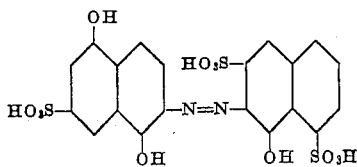

The thus-prepared product corresponds to the formula

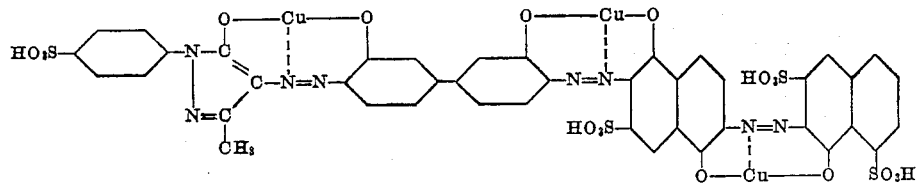

Furthermore, additional dyestuffs having similar properties are obtained if, while otherwise proceeding as described in the first paragraph of this example, the 25.4 parts of 1-(4'-sulfophenyl)-3-methyl-5-pyrazolone are replaced by an equivalent quantity of any one of the following coupling components:
(a) 1 - (2'-sulfophenyl)-3-methyl-5-pyrazolone,
(b) 1 - (3'-sulfophenyl)-3-methyl-5-pyrazolone,
(c) 1 - (3' - carboxyphenyl) - 3 - methyl-5-pyrazolone,
(d) 1-phenyl-3-methyl-5-pyrazolone,
(e) 1-phenyl-5-pyrazolone-3-carboxylic acid,
(f) 2 - amino-5-hydroxynaphthalene-7-sulfonic acid,
(g) 1-chloro-2-amino-5-hydroxynaphthalene-7-sulfonic acid,
(h) 2 - methylamino-5-hydroxynaphthalene-7-sulfonic acid, or
(i) 2 - (4' - carboxyphenylamino) - 8 - hydroxynaphthalene-6-sulfonic acid.

In each case, the obtained final copper complex dyes cotton in fast gray shades. The formulae of representative ones of these products follow:

(c)

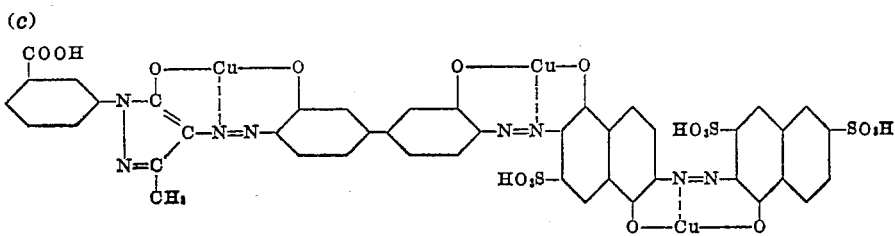

(e)

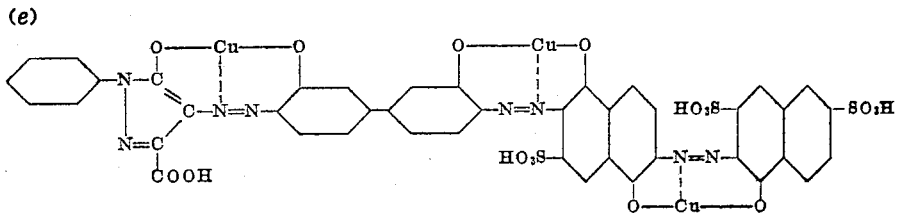

(g)

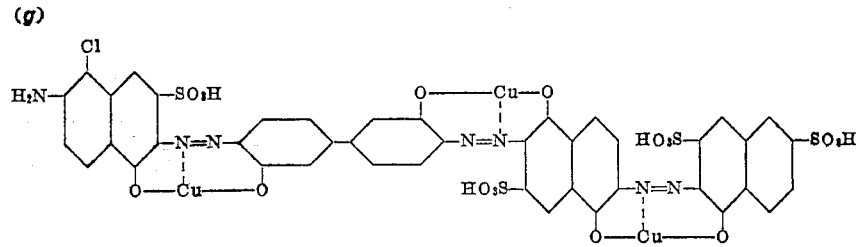

(h)

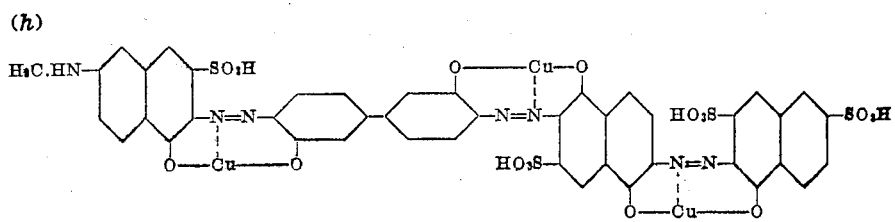

(i)

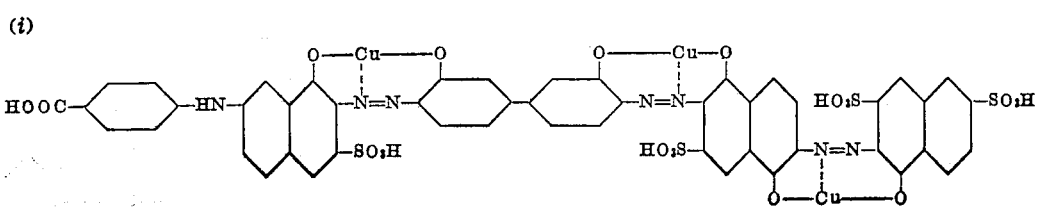

Example 5

The tetrazo compound from 24.4 parts of 3,3'-dimethoxy-4,4'-diamino-1,1'-diphenyl is added to a solution of 110.4 parts of the copper complex of the monoazo dyestuff of the formula

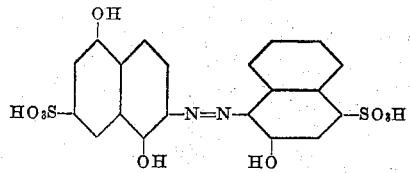

500 parts of pyridine and 100 parts of aqueous ammonia (25%) in 1000 parts of water. Upon completion of the coupling, the formed tetrakisazo dyestuff is isolated and subjected to demethylating coppering.

The thus prepared copper complex of the tetrakisazo dyestuff is, in the dry state, a dark powder which dissolves in water with blue coloration and in concentrated sulfuric acid with green-blue coloration, and dyes cotton in greenish gray shades.

It corresponds to the formula

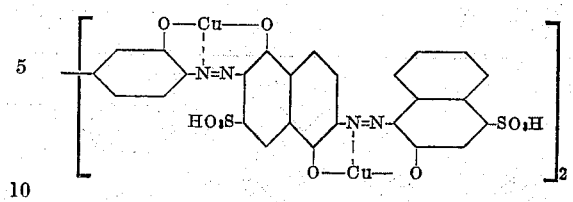

The following table sets forth in summarized form further exemplary embodiments of the invention, the products of which are prepared in a manner entirely analogous to the procedure set forth in the preceding examples, 1 mol of the tetrazo compound from 3,3'-dimethoxy-4,4'-diamino-1,1'-diphenyl being coupled in each case with 1 mol of the indicated monoazo dyestuff (which corresponds to the Formula I, supra, and which may be used in the form of the copper complex) and with 1 mol of the same or of another coupling component, as indicated in the respective formulae:

| Example No. | Copper Complex of— | Shade of Dyeing on Cotton |
|---|---|---|
| 6 | | blue-gray. |
| 7 | | gray. |
| 8 | | blue-gray. |
| 9 | | Do. |

| Example No. | Copper Complex of— | Shade of Dyeing on Cotton |
|---|---|---|
| 10 | | gray. |
| 11 | | gray-blue. |
| 12 | | Do. |
| 13 | | Do. |
| 14 | | Do. |
| 15 | | Do. |

| Example No. | Copper Complex of— | Shade of Dyeing on Cotton |
|---|---|---|
| 16 | | gray-blue. |
| 17 | | Do. |
| 18 | | greenish gray-blue. |
| 19 | | Do. |
| 20 | | gray. |
| 21 | | Do. |
In each of these copper complexes, the copper is bound in accordance with the following type formulae:
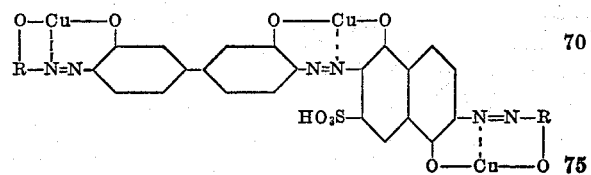
and
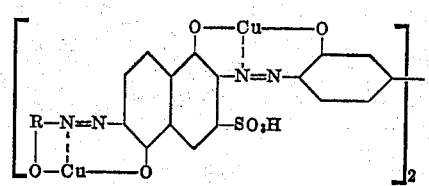

Example 22

20 parts of the dyestuff obtained according to Example 2 (first paragraph) are dissolved in 30,000 parts of water, and 300 parts of sodium chloride are added. 1000 parts of cotton are added, the bath heated to boiling in the course of 30 minutes, the bath maintained at the boil for 15 minutes and, after 15 additional minutes, the material withdrawn, rinsed and dried. The cotton is dyed a fast blue-gray shade.

Having thus disclosed the invention, what is claimed is:

1. A copper complex compound of a polyazo dyestuff corresponding to the formula

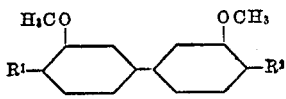

wherein $R^1$ stands for the radical of a monoazo dyestuff selected from the group consisting of

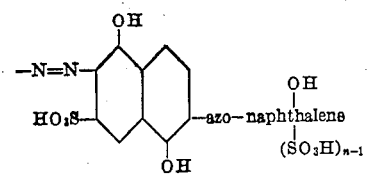

and

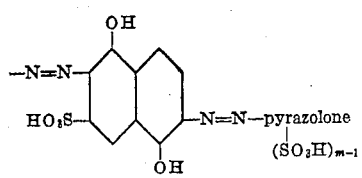

the OH group of "naphthalene" being linked to said radical in ortho-position to -azo-, $n$ is one of the whole numbers 1, 2, 3 and 4, and $m$ is one of the whole numbers 1, 2 and 3, and wherein $R^2$ stands for a substituent selected from the group consisting of

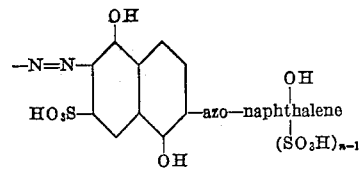

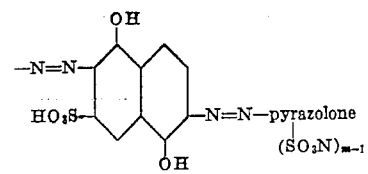

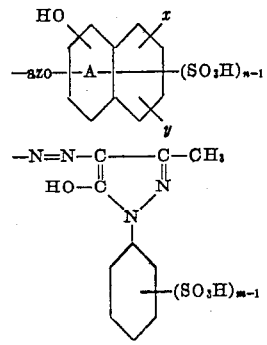

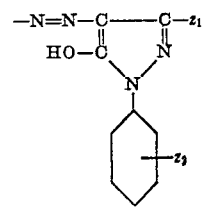

and the OH group of "naphthalene" and the nucleus A respectively being linked to said radicals in ortho-position to -azo-, $n$ is one of the whole numbers 1, 2, 3 and 4, $m$ being one of the whole numbers 1, 2 and 3, $x$ is a member selected from the group consisting of —H, —OH, —NH$_2$, —NH-lower alkyl, —NH-mononuclear aryl and —NH— acyl, $y$ is a member selected from the group consisting of —H, and —Cl, $z_1$ is a member selected from the group consisting of —CH$_3$ and —COOH, and $z_2$ is a member selected from the group consisting of —H and —COOH.

2. A copper complex compound of a polyazo dyestuff corresponding to the formula

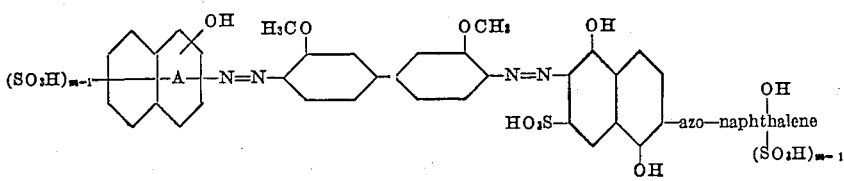

wherein the OH group of "naphthalene" is linked thereto in ortho-position to -azo-, the OH group of nucleus A is linked thereto in ortho-position to —N=N—, and $m$ is one of the integers 1, 2 and 3.

3. A copper complex compound of a polyazo dyestuff corresponding to the formula

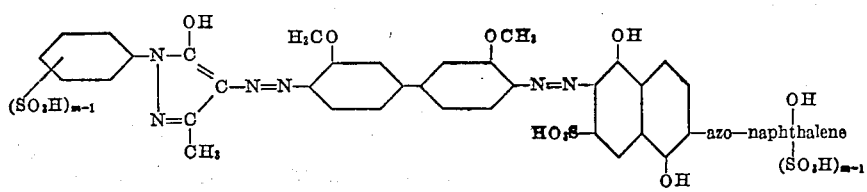

wherein the OH group of "naphthalene" is linked thereto in ortho-position to -azo-, and $m$ is one of the integers 1, 2 and 3.

4. The cupriferous polyazo dyestuff corresponding to the formula

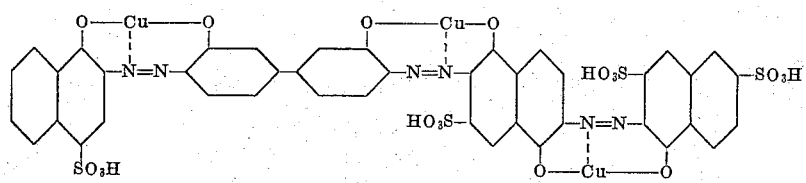

5. The cupriferous polyazo dyestuff corresponding to the formula

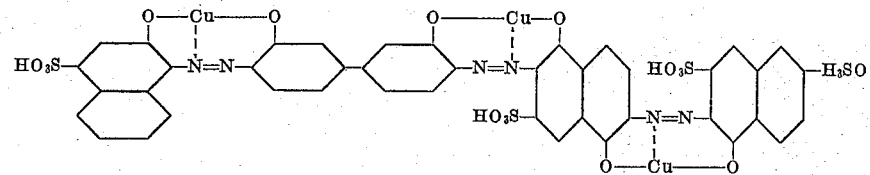

6. The cupriferous polyazo dyestuff corresponding to the formula

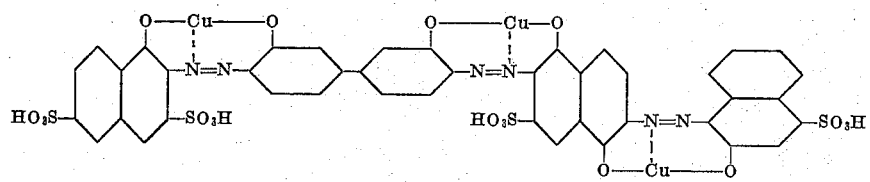

7. The cupriferous polyazo dyestuffs corresponding to the formula

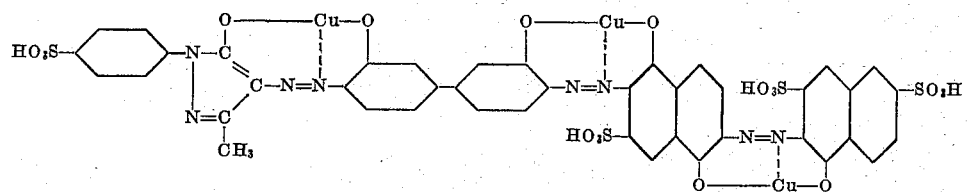

8. The cupriferous polyazo dyestuff corresponding to the formula

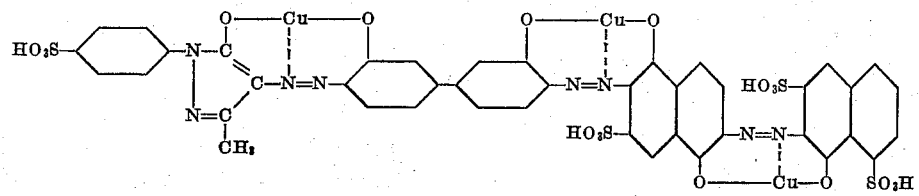

HANS RUCKSTUHL.
WALTER WEHRLI.

No references cited.